(12) United States Patent
Park

(10) Patent No.: US 11,490,780 B2
(45) Date of Patent: Nov. 8, 2022

(54) OPERATIONAL STATE ANALYZABLE DISHWASHER AND METHOD OF ANALYZING OPERATIONAL STATE OF DISHWASHER

(71) Applicant: LG ELECTRONICS INC., Seoul (KR)

(72) Inventor: Yun Sik Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 445 days.

(21) Appl. No.: 16/687,167

(22) Filed: Nov. 18, 2019

(65) Prior Publication Data

US 2021/0068612 A1    Mar. 11, 2021

(30) Foreign Application Priority Data

Sep. 6, 2019    (KR) .................. 10-2019-0111002

(51) Int. Cl.
| | | |
|---|---|---|
| *B08B 3/00* | (2006.01) | |
| *A47L 15/42* | (2006.01) | |
| *G06N 3/04* | (2006.01) | |
| *G06N 3/08* | (2006.01) | |
| *G08B 21/18* | (2006.01) | |
| *G10L 25/51* | (2013.01) | |

(52) U.S. Cl.
CPC ........ *A47L 15/4208* (2013.01); *G06N 3/0436* (2013.01); *G06N 3/08* (2013.01); *G08B 21/182* (2013.01); *G10L 25/51* (2013.01)

(58) Field of Classification Search
CPC ....................................................... B08B 3/00
See application file for complete search history.

(56) References Cited

U.S. PATENT DOCUMENTS

| | | | | |
|---|---|---|---|---|
| 5,493,877 A | * | 2/1996 | Wickremasinghe | .. D06F 39/081 |
| | | | | 73/304 R |
| 6,480,113 B1 | * | 11/2002 | Esposito | .............. G08B 21/082 |
| | | | | 200/DIG. 4 |
| 2014/0053873 A1 | * | 2/2014 | Watson | ................... A47L 15/23 |
| | | | | 134/18 |
| 2014/0158163 A1 | * | 6/2014 | Montgomery | ...... A47L 15/0002 |
| | | | | 210/791 |

(Continued)

FOREIGN PATENT DOCUMENTS

| | | |
|---|---|---|
| JP | 5279628 B2 | 9/2013 |
| KR | 10-2011-0046175 A | 5/2011 |

*Primary Examiner* — Olisa Anwah
(74) *Attorney, Agent, or Firm* — Birch, Stewart, Kolasch & Birch, LLP

(57) ABSTRACT

A method and a dishwasher capable of analyzing the closure state of the filter of the dishwasher by using a deep neural network model trained through machine learning of artificial intelligence is provided. The dishwasher may include a microphone configured to obtain a drainage sound signal generated by draining washing water through the filter during operation of the dishwasher, a processor configured to analyze the degree of closure of the filter based on the drainage sound signal, and an alarm generator configured to generate an alarm if the degree of closure is a greater than or equal to a predetermined level. The operational state of the dishwasher may be analyzed based on a drainage sound of the washing water drained to the filter by the degree of closure of the filter.

16 Claims, 7 Drawing Sheets

(56) References Cited

U.S. PATENT DOCUMENTS

| | | | |
|---|---|---|---|
| 2018/0110397 A1* | 4/2018 | Kim | A47L 15/4278 |
| 2018/0347764 A1* | 12/2018 | Kellar | F17D 5/06 |
| 2019/0045998 A1* | 2/2019 | Calvimontes | A47L 15/4276 |
| 2019/0062982 A1* | 2/2019 | Li | D06F 37/36 |
| 2019/0234786 A1* | 8/2019 | Klicpera | G01M 3/26 |
| 2020/0004273 A1* | 1/2020 | Han | G05D 7/0623 |
| 2020/0291564 A1* | 9/2020 | O'Malley | D06F 33/42 |
| 2020/0352408 A1* | 11/2020 | Durham | A47L 15/0031 |
| 2020/0392710 A1* | 12/2020 | Saruta | G06Q 10/20 |

* cited by examiner

OPERATIONAL STATE ANALYZABLE DISHWASHER AND METHOD OF ANALYZING OPERATIONAL STATE OF DISHWASHER

CROSS-REFERENCE TO RELATED APPLICATION

This present application claims benefit of priority to Korean Patent Application No. 10-2019-0111002, entitled "OPERATIONAL STATUS ANALYSIS ABLE DISHWASHER AND METHODS FOR ANALYZING THE OPERATING CONDITION OF DISHWASHERS," filed on Sep. 6, 2019, in the Korean Intellectual Property Office, the entire disclosure of which is incorporated herein by reference.

BACKGROUND

1. Technical Field

The present disclosure relates to a technology capable of analyzing the degree of closure of a filter of a dishwasher through the drainage sound when washing an object. More particularly, the present disclosure relates to a technology capable of learning the drainage sound of the washing water drained to a filter according to the closed size of the filter installed in the dishwasher, and notifying a user of the filter state by matching the washing sound caused by draining the washing water generated when washing an object and the learned drainage sound.

2. Description of Related Art

The following description is only for the purpose of providing background information related to embodiments of the present disclosure, and the contents to be described do not necessarily constitute related art.

A dishwasher is a device for automatically washing dishes, such as used dishes, and since the dishwashing is made automatically, the convenience of the user is improved, and in recent years, the supply is a trend of being spread.

A washing process of the dishwasher may perform the washing by a series of operations in which the washing water having passed through a filter installed in the dishwasher is pressurized by a washing pump, sprayed from a nozzle, and returns to the washing pump through the filter again.

However, there has been a problem in that when the filter installed in the dishwasher is clogged with foreign matter, the amount of water flowing into the washing pump is reduced, which reduces the amount of circulating water, thereby weakening cleaning performance.

To this end, when a user asks the dishwasher about the degree of filter clogging or the filter clogging occurs for a certain level or more, the user is notified of the filter clogging so that the filter may be replaced or the clogging may be removed.

Accordingly, a method of notifying the dishwasher user of the degree of closure of the filter to prevent the washing from being lowered due to the filter clogging is being sought.

Specifically, Japanese Patent No. 5279628, 'DISHWASHER,' as a technology of notifying the degree of closure of the filter, discloses a technology capable of detecting filter clogging through a filter clogging detecting means when a washing water level becomes a reference water level of closing the filter.

However, the 'DISHWASHER' does not disclose a technology of notifying the user of the filter clogging so that the filter may be replaced or the clogging may be removed when a user asks the dishwasher about the degree of filter clogging or the filter clogging occurs for a certain level or more.

Further, Korean Patent Laid-Open Publication No. 10-2011-0046175, 'DISHWASHER HAVING FILTER CLOGGING SENSING MEANS AND CONTROL METHOD THEREOF,' discloses a technology of using a filter clogging sensing means to analyze the filter as being clogged when the internal pressure of the filter is measured and a predetermined pressure or more.

However, since the 'DISHWASHER HAVING FILTER CLOGGING SENSING MEANS AND CONTROL METHOD THEREOF' analyzes the closed filter when the pressure generated by the foreign matter loaded in the filter is a certain magnitude or more, there is a burdensome in which a separate device capable of measuring the pressure of the filter should be installed.

Further, it is difficult to confirm how degree the current filter state is because the user is notified of the filter clogging when the filter has been clogged to a certain degree (when a pressure of a predetermined pressure or more generates).

Accordingly, there is a need for a technology capable of confirming the filter state in real time according to the user's needs.

The above-described background technology is technical information that the inventors hold for the derivation of the present disclosure or that the inventors obtained in the process of deriving the present disclosure, and may not be regarded as known technology disclosed to the general public prior to the filing of the present application.

SUMMARY OF THE DISCLOSURE

An embodiment of the present disclosure is to confirm whether the filter configured to filter foreign matter is clogged.

Further, another embodiment of the present disclosure is to learn the drainage sound of the washing water drained to a filter according to the degree of filter clogging, and then to analyze the degree of the filter clogging based on a signal corresponding to the drainage sound generated when a dishwasher operates and the learned drainage sound by matching the drainage sound generated when the dishwasher operates and the learned drainage sound.

Further, still another embodiment of the present disclosure is to generate an alarm when the degree of closure of a filter is a predetermined level or more by matching the drainage sound generated when a dishwasher operates and the learned drainage sound to notify the user who uses the dishwasher of the filter clogging.

The present disclosure is not limited to solving the above-described problems, and other aspects and advantages of the present disclosure may be appreciated by those skilled in the art based on the following description and will be understood more clearly from embodiments of the present disclosure. It is also to be understood that the aspects of the present disclosure may be realized by means and combinations thereof set forth in claims.

A method of determining an operational state of a dishwasher by sensing the closure of a filter according to an embodiment of the present disclosure may be performed in a process of obtaining a drainage sound signal generated by draining washing water through the filter at operation of the dishwasher, analyzing the degree of closure of the filter based on the drainage sound signal, and then generating an alarm if the degree of closure is a predetermined level or more.

Specifically, when obtaining the drainage sound signal, the drainage sound signal may be extracted at the time point at which the operation of the dishwasher is stopped and the washing water is drained to the filter.

Alternatively, when obtaining the drainage sound signal, an operational plan from the operating start time point of the dishwasher to the operating completion time point of the dishwasher may be stored, and the drainage sound signal may also be obtained from the time point at which the washing water flows into the dishwasher according to the operational plan.

Accordingly, it is possible to prevent the noise generated at operation of the dishwasher from interfering with the drainage sound signal, thereby analyzing the closure state of the filter closure more accurately.

Further, a reference signal of a drainage sound drained through the filter for each degree of closure of the filter through which the washing water is drained may be obtained, and a matching table comprising the obtained reference signal by matching with each of degrees of closure of the filter may be generated, then the degree of closure of the filter may be analyzed, and then the degree of closure of the filter matching with the drainage sound signal by using the matching table may be analyzed.

Further, when analyzing the degree of closure of the filter, the obtained drainage sound signal is input to a pre-trained neural network model so as to analyze the degree of closure of the filter according to the sound signal generated by draining the washing water through the filter, and the degree of closure of the filter is analyzed based on the output from the neural network model.

Further, when obtaining the drainage sound signal in the method of determining the operational state of the dishwasher according to an embodiment of the present disclosure, a sound generated in the dishwasher may be obtained, information on the operational state of the dishwasher may be received, then noise in the dishwasher according to the operational state may be analyzed, and then the drainage sound signal may be extracted by removing the noise from the sound.

Meanwhile, a dishwasher configured to analyze an operational state by sensing the closure of a filter according to an embodiment of the present disclosure may include a microphone configured to obtain a drainage sound signal generated by draining washing water through the filter at operation of the dishwasher, a processor configured to analyze the degree of closure of the filter based on the drainage sound signal, and an alarm generator configured to generate an alarm if the degree of closure is a predetermined level or more.

Specifically, the microphone may extract the drainage sound signal at the time point at which the operation of the dishwasher is stopped and the washing water is drained.

Alternatively, the microphone may obtain the drainage sound signal from the time point at which the washing water flows into the dishwasher according to an operational plan from the operating start time point of the dishwasher to the operating completion time point of the dishwasher.

Accordingly, it is possible to prevent the noise generated at operation of the dishwasher from interfering with the drainage sound signal, thereby analyzing the closure state of the filter closure more accurately.

Further, the dishwasher according to an embodiment of the present disclosure may further include a memory configured to store a matching table including a reference signal of a drainage sound drained through the filter for each degree of closure of the filter through which the washing water is drained, and the processor may be configured to analyze the degree of closure of the filter matching with the drainage sound signal by using the matching table.

Specifically, the processor may be configured to input the obtained drainage sound signal to a pre-trained neural network model so as to analyze the degree of closure of the filter according to a sound signal generated by draining the washing water through the filter, and to analyze the degree of closure of the filter based on the output from the neural network model.

Further, the microphone may obtain a sound generated in the dishwasher comprising a drainage sound, and the processor may be configured to analyze noise in the dishwasher generated according to the operational state of the dishwasher, and to extract the drainage sound signal by removing the noise from the sound generated in the dishwasher obtained from the microphone.

Meanwhile, an electronic device configured to analyze whether it is abnormality by sensing the closure of a filter according to an embodiment of the present disclosure may include a tub having an accommodation space in which an object is accommodated, a washing water supplier configured to accommodate washing water supplied into the tub, and to supply steam generated by heating the washing water to the tub through a plurality of steam flow paths, a filter through which the washing water is drained from the tub, and a processor configured to analyze the operational state based on a drainage sound signal of the washing water drained to the filter by the degree of closure of the filter.

Specifically, the electronic device according to an embodiment of the present disclosure may further include a memory configured to store a matching table including a reference signal of a drainage sound drained through the filter for each degree of closure of the filter through which the washing water is drained, and the processor may be configured to analyze the degree of closure of the filter matching with the drainage sound signal by using the matching table.

Further, the processor may be configured to input the obtained drainage sound signal to a pre-trained neural network model so as to analyze the degree of closure of the filter according to a sound signal generated by draining the washing water through the filter, and to analyze the degree of closure of the filter based on the output from the neural network model.

At this time, the electronic device according to an embodiment of the present disclosure further includes a microphone configured to obtain the drainage sound signal of the washing water, and the microphone obtains the drainage sound signal at the time point at which the operation of the dishwasher is stopped and the washing water is drained to the filter.

Specifically, the microphone may obtain the drainage sound signal from the time point at which the washing water flows into the dishwasher according to an operational plan from the operating start time point of the dishwasher to the operating completion time point of the dishwasher.

Further, the microphone may obtain a sound generated in the dishwasher comprising a drainage sound, and the processor may be configured to analyze noise in the dishwasher generated according to the operational state of the dishwasher, and to extract the drainage sound signal by removing the noise from the sound generated in the dishwasher obtained from the microphone.

Other aspects and features than those described above will become apparent from the following drawings, claims, and detailed description of the present disclosure.

According to the present disclosure, it is possible to learn the drainage sound of the washing water drained to the filter according to the degree of filter clogging, and then to analyze the degree of the filter clogging based on the signal corresponding to the drainage sound generated when the dishwasher operates and the learned drainage sound by matching the drainage sound generated when the dishwasher operates and the learned drainage sound.

Further, the present disclosure may generate the alarm when the degree of closure of the filter is the predetermined level or more by matching the drainage sound generated when the dishwasher operates and the learned drainage sound to notify the user who uses the dishwasher of the filter clogging.

Specifically, it is possible to analyze the degree of closure of the filter, and to generate the alarm when the degree of closure is the predetermined level or more. That is, it is possible to notify the use of the filter closure state so that the filter may be replaced or exchanged at an appropriate time.

The effects of the present disclosure are not limited to those mentioned above, and other effects not mentioned may be clearly understood by those skilled in the art from the following description.

DETAILED DESCRIPTION

Figure 1:
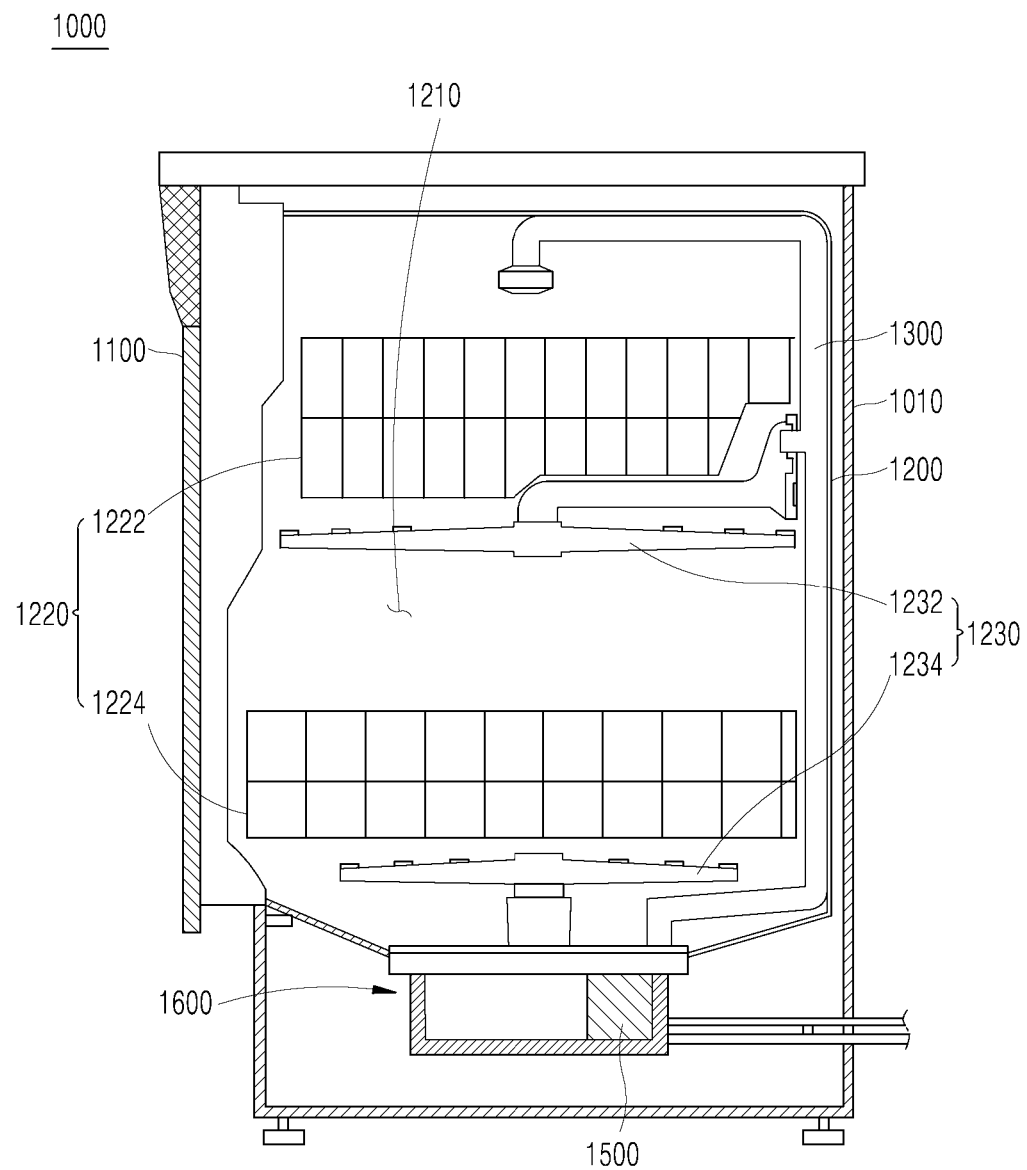
FIG. 1 is a cross-sectional diagram of a dishwasher according to an embodiment of the present disclosure.

Hereinafter the embodiments disclosed in this specification will be described in detail with reference to the accompanying drawings. The present disclosure may be embodied in various different forms and is not limited to the embodiments set forth herein. Hereinafter in order to clearly describe the present disclosure, parts that are not directly related to the description are omitted, but in implementing an apparatus or a system to which the spirit of the present disclosure is applied, it is not meant that such an omitted configuration is unnecessary. Further, like reference numerals refer to like elements throughout the specification.

In the following description, although the terms "first", "second", and the like may be used herein to describe various elements, these elements should not be limited by these terms. These terms may be only used to distinguish one element from another element. Also, in the following description, the articles "a," "an," and "the," include plural referents unless the context clearly dictates otherwise.

In the following description, it will be understood that terms such as "comprise," "include," "have," and the like are intended to specify the presence of stated feature, integer, step, operation, component, part or combination thereof, but do not preclude the presence or addition of one or more other features, integers, steps, operations, components, parts or combinations thereof.

Figure 2:
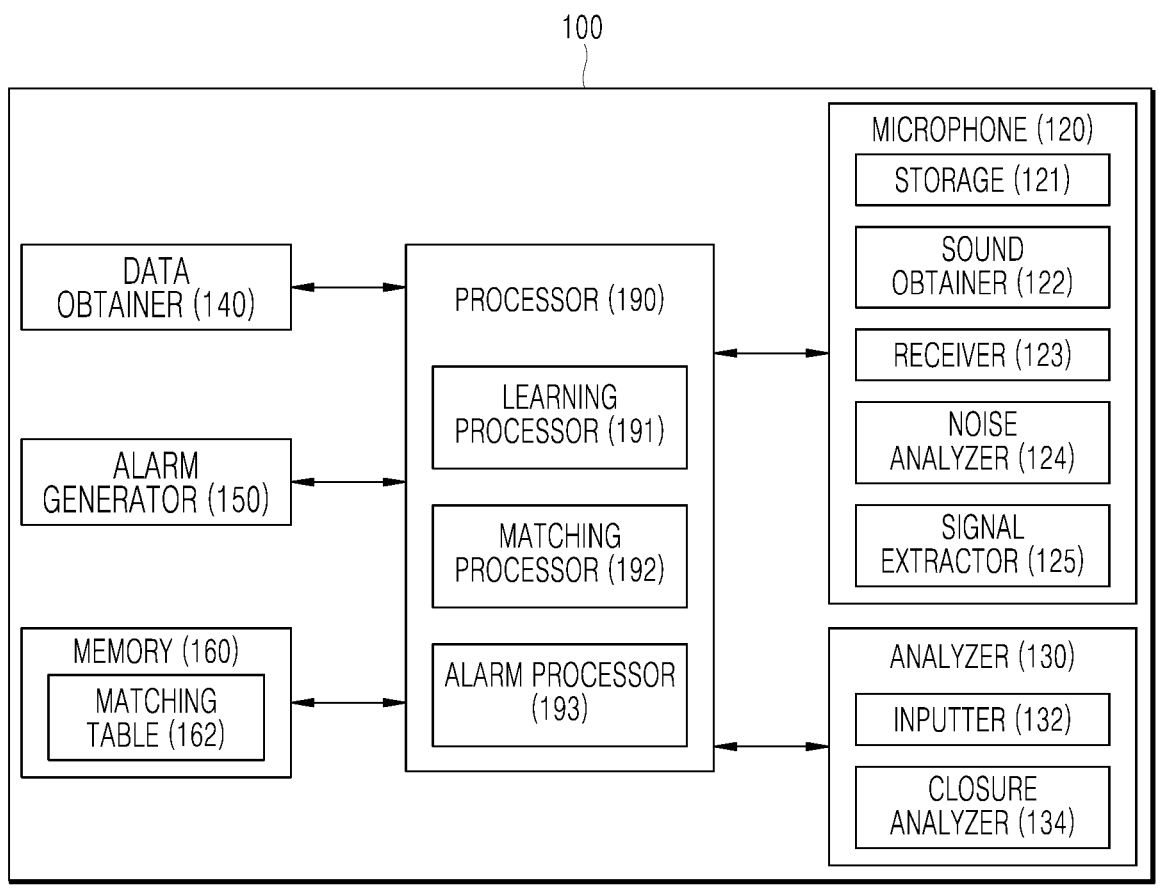
FIG. 2 is a block diagram schematically showing a dishwasher according to an embodiment of the present disclosure.

FIG. 1 is a cross-sectional diagram of a dishwasher according to an embodiment of the present disclosure, and FIG. 2 is a block diagram schematically showing a dishwasher according to an embodiment of the present disclosure.

As shown in FIG. 1, a dishwasher 1000 according to an embodiment of the present disclosure may include a tub 1200 forming a cabinet 1010 having a large appearance and a washing chamber 1210 in which dishes are washed, a door 1100 configured to open and close the tub 1200, and a sump assembly 1600 configured to supply and recover washing water.

The washing chamber 1210 configured to accommodate the dishes is formed in the tub 1200, and a plurality of racks 1220 on which the dishes may be placed are installed in the washing chamber 1210. In the state where the dishes have been stored in the rack 1220, the washing water is sprayed through a spray arm 1230 to wash the dishes.

The spray arm 1230 may be composed of an upper arm 1232 disposed below an upper rack 1222 and a lower arm 1234 disposed below a lower rack 1224. Further, the upper arm 1232 and the lower arm 1234 are rotatably installed, respectively, and a plurality of spray nozzles (not shown) configured to spray the washing water toward the dishes may be formed in each spray arm 1230.

The sump assembly 1600 may be connected with the upper arm 1232 and the lower arm 1234 by a connection pipe 1300. The sump assembly 1600 may receive the washing water from an external water source through a water supply pipe 1400 to store it in a sump (not shown), and supply the washing water to the upper arm 1232 and the lower arm 1234 through the connection pipe 1300 selectively or simultaneously. The washing water used for washing is drained through a drainage pipe (not shown).

Meanwhile, the dishwasher includes a filter 1500 configured to filter the washing water supplied to the sump and has at least a part communicated with the tub. The filter 1500 is a device configured to prevent foreign matter from flowing into a washing pump or a drainage pump. Specifically, the dishwasher in which the filter 1500 has been installed may be driven through a series of operations in which the washing water having passed through the filter is pressurized by the washing pump, sprayed from the nozzle, and then returns to the washing pump through the filter again.

If the filter has been clogged by foreign matter, the amount of the washing water flowing into the washing pump may be reduced, which reduces the amount of circulating water, thereby weakening the cleaning performance of the dishwasher.

To this end, it is possible to analyze the degree of closure of the filter 1500 through the drainage sound of the washing water drained to the filter 1500. That is, it is possible to sense the closure of the filter through a change in the drainage sound of the washing water drained to the filter, and to analyze the operational state of the dishwasher by sensing the closure of the filter.

Specifically, the dishwasher 1000 capable of sensing the closure of the filter 1500 may include a microphone 120 configured to obtain a drainage sound signal generated by draining the washing water through the filter 1500 when the dishwasher 1000 operates, a processor 190 configured to analyze the degree of closure of the filter 1500 based on the drainage sound signal, an alarm generator 150 configured to generate an alarm when the degree of closure is a predetermined level or more, and the like.

The dishwashing may be performed by putting the dishes for washing into the dishwasher 1000 and driving the dishwasher 1000. At dishwashing, the washing water having washed the dishes may be circulated or drained. In this series of processes, the drainage sound of the washing water generated while the washing water is drained through the filter may be obtained by the microphone 120.

For example, the microphone 120 may extract the drainage sound signal at the time point at which the operation of the dishwasher is stopped and the washing water is drained to the filter 1500. That is, the microphone 120 extracts the drainage sound signal from the time point at which the washing water flows into the filter in order to prevent the noise of the surroundings together when extracting the drainage sound signal.

As another example, in order to extract the drainage sound signal, the microphone 120 may further include a storage 121 configured to store a series of operational plans from in-flow of the washing water to dry of the washed dishes that is an operational plan from the time point at which the dishwasher 1000 operates to the time point at which the operation of the dishwasher 1000 is completed.

As described above, according to the operational plan stored in the storage 121, the drainage sound signal may be obtained from the time point at which the washing water flows into the dishwasher. That is, the time point at which the drainage sound signal is generated is the time point at which the washing water flows into the dishwasher. Further, since the operational plan repeatedly performs a process of washing, rinsing, drying, and the like for a certain time, the time point at which the washing water flows may flow into according to a predetermined operational plan. As described above, it is possible to set to obtain the drainage sound signal only at the time point at which the washing water flows into based on the operational plan stored in the storage 121, thereby preventing the noise generated at operation of the dishwasher from interfering with the drainage sound signal, and accordingly, to analyze the closure state of the closure of the filter more accurately.

As another example, in order to extract the drainage sound signal, the microphone 120 may include a sound obtainer 122, a receiver 123, a noise analyzer 124, and a signal extractor 125.

The sound generated in the dishwasher may be obtained through the sound obtainer 122, and the sound generated in the dishwasher 1000 and the operational state information of the dishwasher may be received through the receiver 123. That is, the sound generated while the dishwasher drives and the operational state of the current dishwasher are confirmed.

At this time, the operational state of the dishwasher may be confirmed based on the pre-stored operational plan as described above, and otherwise, the user may also visually confirm the operational state of the dishwasher. In the following embodiment of the present disclosure, an example capable of confirming the state of the dishwasher based on the pre-stored operational plan will be described.

When the receiver 123 receives the operational state information of the dishwasher 1000, the noise analyzer 124 may analyze the noise of the dishwasher 1000 according to the operational state. At this time, the generated noise of the dishwasher means a sound that may be generated in the dishwasher, such as a sound generated when the washing water is sprayed on the dishes, a rotating sound of the nozzle when the washing water is sprayed, a driving sound of a motor, and the like in addition to the drainage sound signal of the washing water.

When the noise in the dishwasher is analyzed, the signal extractor 125 may extract only the drainage sound of the washing water by removing the noise from the sound of the dishwasher 1000 according to the operation. That is, the remaining sounds are removed except for only the drainage sound from the entire sound that may be generated in the dishwasher 1000. Accordingly, it is possible to analyze only the drainage sound signal generated when the washing water is drained, thereby analyzing the degree of closure of the filter 1500 more accurately.

As described above, when the microphone 120 obtains the drainage sound signal, the analyzer 130 may analyze the degree of closure of the filter 1500 based on the obtained drainage sound signal.

The degree of closure of the filter 1500 means, for example, a random division between 0% of filter clogging that is a fully open state where the foreign material does not occur in the filter 1500 and 100% of full closure due to foreign matter occurring in the filter 1500. Hereinafter, the embodiment of the present description, for convenience of description, will be described by dividing the degree of closure of the filter 1500 into a first closure stage (filter clogging 0 to 35%), a second closure stage (filter clogging 35 to 70%), and a third closure stage (filter clogging 70 to 100%).

Meanwhile, when the dishes that are objects accommodated in the dishwasher 1000 are washed before analyzing the closure state of the filter 1500 and the drained washing water flows into, the drainage sound signal data drained to the filter 1500 may be obtained according to the closure stage of the filter 1500. To this end, the dishwasher 1000 further includes a data obtainer 140 configured to obtain the drainage sound signal data.

Specifically, the data obtainer 140 may obtain the drainage sound signal data in the first closure stage, the second closure stage, and the third closure stage in order of increasing the degree of closure of the filter. At this time, the first closure stage, the second closure stage, and the third closure stage will be described under the same condition as the first closure stage (filter clogging 0 to 35%), the second closure stage (filter clogging 35 to 70%), and the third closure stage (filter clogging 70 to 100%) exemplified above.

The drainage sound signal data obtained by the data obtainer 140 may be stored in the memory 160 to be described later. In order to store the drainage sound signal data and analyze the drainage sound signal, the analyzer 130 includes an inputter 132 and a closure analyzer 134.

The inputter 132 may input the obtained drainage sound signal to a pre-trained neural network model so as to analyze the degree of closure of the filter 1500 according to the sound signal generated by draining the washing water through the filter 1500.

When the drainage sound signal is input to the inputter 132, the closure analyzer 134 may analyze the degree of closure of the filter 1500 based on information output from the neural network model.

That is, the microphone 120 obtains the drainage sound signal generated by draining the washing water through the filter 1500, and the obtained drainage sound signal is input to the inputter 132. Thereafter, the closure analyzer 134 may analyze the degree of closure of the filter 1500 based on the drainage sound signal data information output from the neural network model stored in the memory 160.

That is, the closure analyzer 134 compares the previously stored drainage sound signal data information with the input drainage sound signal. Thereafter, the degree of closure of the filter 1500 is analyzed with a sound signal generated when the washing water flows into the filter 1500 and is drained by analyzing the drainage sound signal matched with the drainage sound signal data.

As described above, the degree of closure of the filter 1500 may be analyzed, and the alarm may be generated through the alarm generator 150 when the degree of closure is a predetermined level or more. That is, the user is notified of the closure state of the filter 1500 so that the filter 1500 may be replaced or exchanged.

For example, in an embodiment of the present disclosure, it may be assumed that a third closure degree is a predetermined level, and when the degree of closure of the filter is measured as the third closure stage, the alarm may be generated through the alarm generator 150.

Meanwhile, the dishwasher 1000 of the present disclosure further includes a memory 160 configured to store a matching table 162 including a reference signal of the drain sound drained through the filter 1500 for each degree of closure of the filter 1500 through which the washing water is drained.

As described above, the memory 160 may store a pre-trained neural network model so as to analyze the degree of closure of the filter 1500 according to the sound signal generated by draining the washing water.

Specifically, the memory 160 may store a learning data set labeled with the drainage sound signal data generated according to the degree of closure of the filter 1500. For example, the drainage sound signal data generated when the washing water is drained in each of the first closure stage, the second closing degree, and the third closure stage.

The thus stored learning data set may be trained through a training program for each degree of closure. That is, the filter closure state is trained for each of the first closure stage (filter clogging 0 to 35%), the second closure stage (filter clogging 35 to 70%), and the third closure stage (filter clogging 70 to 100%). Meanwhile, although an embodiment of the present disclosure has described the training for each of the first closure stage (filter clogging 0 to 35%), the second closure stage (filter clogging 35 to 70%), and the third closure stage (filter clogging 70 to 100%), the degree of closure may be divided according to the condition, and the present disclosure is not limited by the degree of closure divided.

Meanwhile, the training may be performed in the dishwasher 1000 itself, which is an electronic device, but also performed outside the dishwasher, and only the filter closure degree information derived as the training result may also be delivered to and stored in the dishwasher 1000.

As described above, the trained neural network model generated by the training may be stored in the memory 160. Based on the stored trained neural network model, the degree of the clogging state of the filter 1500 may be analyzed by the drainage sound signal generated when the washing water flows into the filter 1500.

Further, the memory 160 records various types of information necessary for controlling an electronic device such as a dishwasher in order to analyze the degree of closure of the filter 1500, and may include a volatile or nonvolatile recording medium. The recording medium stores data that may be read out by the processor 190, and may include a hard disk drive (HDD), a solid state disk (SSD), a silicon disk drive (SDD), a ROM, a RAM, a CD-ROM, a magnetic tape, a floppy disk, an optical data storage device, or the like. In the present embodiment, the information stored in the memory 110 will be described for each situation according to the context.

In an embodiment of the present disclosure, the information on the filter closure information of the dishwasher 1000 stored in the memory 160 will be described, for example, as being received from an external server (not shown). Such a server may be a database server that provides big data necessary for applying various artificial intelligence algorithms and data relevant to voice recognition. Further, the server may also include a web server or an application that may remotely control the electronic device through a communicator (not shown) configured to communicate with an application or a web browser installed on the electronic device.

The processor 190 may control the memory 160, the alarm generator 150, and the like. Further, the processor 190 may include a learning processor 191 capable of training the neural network model, a matching processor capable of analyzing the degree of closure of the filter 1500 matching with the drainage sound signal by using the matching table 162 of the memory 160, an alarm processor 193 capable of notifying the degree of closure of the filter 1500 based on the analyzed drainage sound signal, and the like.

Further, the processor 190 may include any types of devices capable of processing data. Here, the 'processor' may mean a data processing device embedded in hardware having, for example, a circuit physically structured to perform a function represented by codes or instructions included in a program. As described above, as an example of the data processing device embedded in hardware, it may include a processing device such as a microprocessor, a central processing unit (CPU), a processor core, a multiprocessor, an application-specific integrated device (ASIC), or a field programmable gate array (FPGA), but the scope of the present disclosure is not limited thereto.

As described above, in order to analyze the closure state of the filter 1500 installed in the dishwasher 1000, the drainage sound signal generated by draining the washing water through the filter 1500 is obtained in a state of having learned the drainage sound generated by draining the washing water according to the degree of closure of the filter 1500. Thereafter, the degree of closure of the filter 1500 may be analyzed based on the drainage sound signal data information output from the neural network model stored in the memory 160.

As described above, the degree of closure of the filter 1500 may be analyzed, and an alarm may be generated when the degree of closure is a predetermined level or more. That is, it is possible to notify the user of the closure state of the filter 1500, thereby replacing or exchanging the filter 1500.

Figure 3:
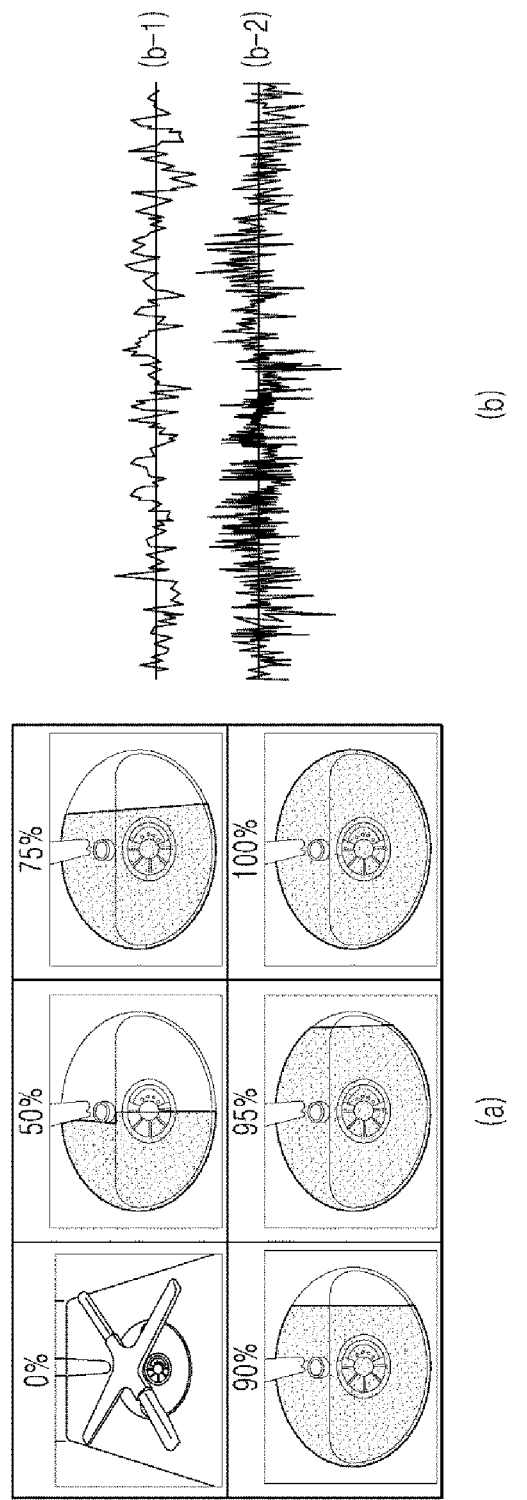
FIG. 3 is a diagram showing an example the drainage sound according to the degree of closure of a filter of a dishwasher according to an embodiment of the present disclosure.
Figure 4:
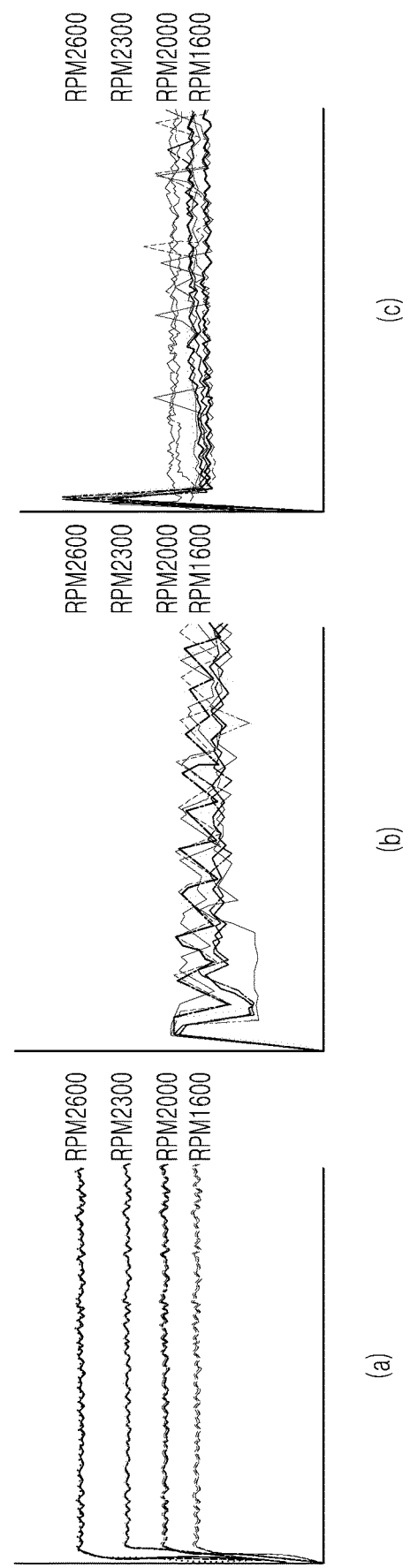
FIG. 4 is a diagram showing an example of a motor current pattern according to the degree of closure of a filter of a dishwasher according to an embodiment of the present disclosure.

FIG. 3 is a diagram showing an example of the drainage sound according to the degree of closure of the filter of the dishwasher according to an embodiment of the present disclosure, and FIG. 4 is a diagram showing an example of a motor current pattern according to the degree of closure of the filter of the dishwasher according to an embodiment of the present disclosure. In the following description, the description of parts overlapping with the description of FIGS. 1 and 2 will be omitted.

Referring to the drawings, the dishwasher 1000 may be installed with the filter 1500 configured to filter foreign matter. At this time, when the washing water flows into the filter 1500, the sound generated by draining the washing water is changed according to the degree of closure of the filter 1500.

For example, the drainage sound of the washing water in the fully open state where the filter 1500 is not closed may emit the sound (b-1) having noise minimized as in (b) of FIG. 3. That is, this is because the interference between the inside of the filter 1500 and the washing water is minimized.

On the contrary, the drainage sound of the washing water in the state where the filter 1500 has been fully closed may emit the sound (b-2) having a maximum noise as in (b) of FIG. 3. That is, that is because the interference between the inside of the filter 1500 and the washing water is maximized, thereby largely generating the drainage sound.

Meanwhile, the state of the dishwasher may be seen as a change in the motor current state according to the degree of the filter clogging. This is because as the filter is closed, the drive of the motor increases for drainage, and accordingly, the motor current consumption may increase.

That is, as shown in (a) of FIG. 4, in the normal stage where the filter 1500 is in an open state, it may be confirmed that a constant current has been consumed according to the RPM of the motor (1700/2000/2300/21600 sequentially from the bottom).

On the contrary, as the filter 1500 is closed, a driving change may occur according to the RPM of the motor. That is, as shown in (b) and (c) of FIG. 4, it may be confirmed that as the filter 1500 is closed, a change in motor driving occurs, and accordingly, a change in current consumption occurs.

As described above, the change in current consumption of the motor may occur according to the degree of closure of the filter 1500, and as a result, the drainage sound signal of the washing water drained to the filter 1500 may be generated variously according to the closure state of the filter 1500.

Based on the above, it is possible to analyze the degree of closure of the filter 1500, and to notify the user of the closure state of the filter 1500 by generating an alarm when the degree of closure is a predetermined level or more, thereby appropriately replacing or exchanging the filter 1500.

Figure 5:
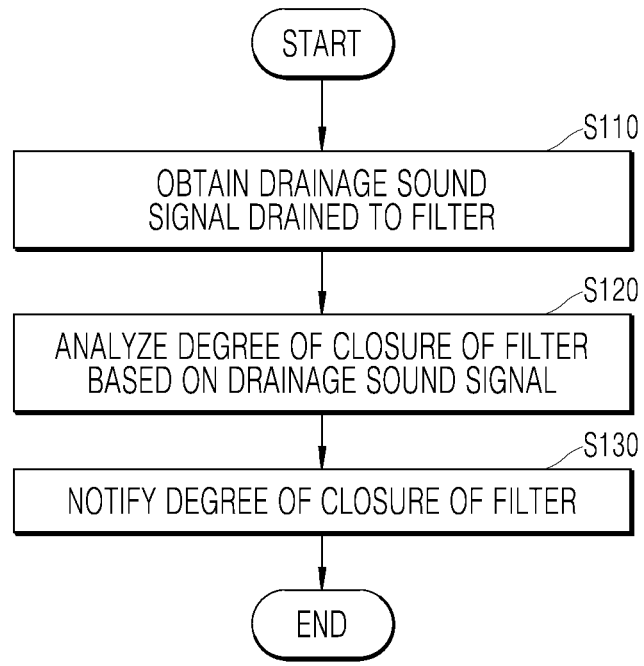
FIG. 5 is a flowchart showing a process of notifying the degree of closure of a filter by a washing water sound signal caused by draining washing water based on drainage sound data according to the degree of closure of the filter according to an embodiment of the present disclosure.
Figure 6:
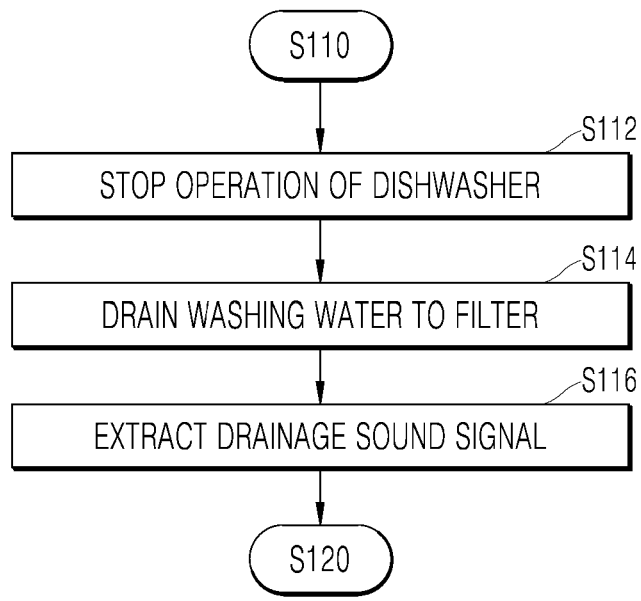
FIG. 6 is a flowchart showing a process of learning drainage sound data according to a first embodiment of FIG. 5.
Figure 7:
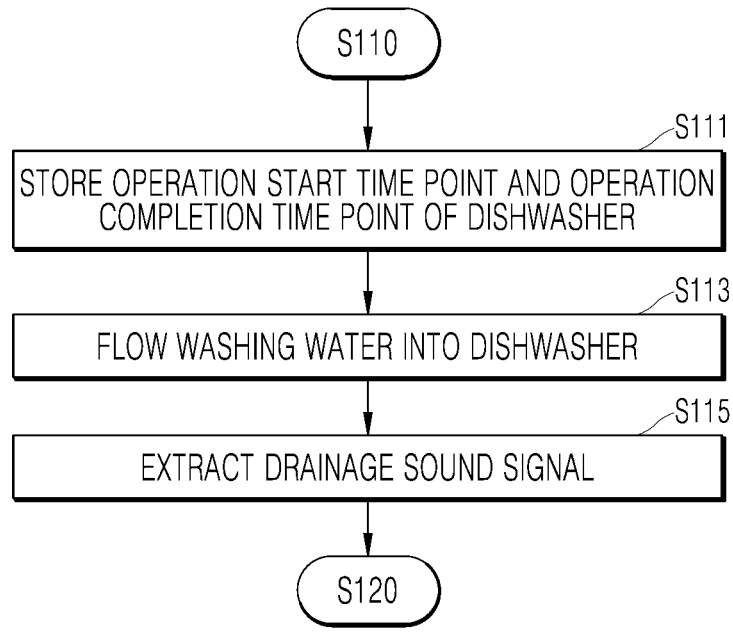
FIG. 7 is a flowchart showing a process of learning drainage sound data according to a second embodiment of FIG. 5.
Figure 8:
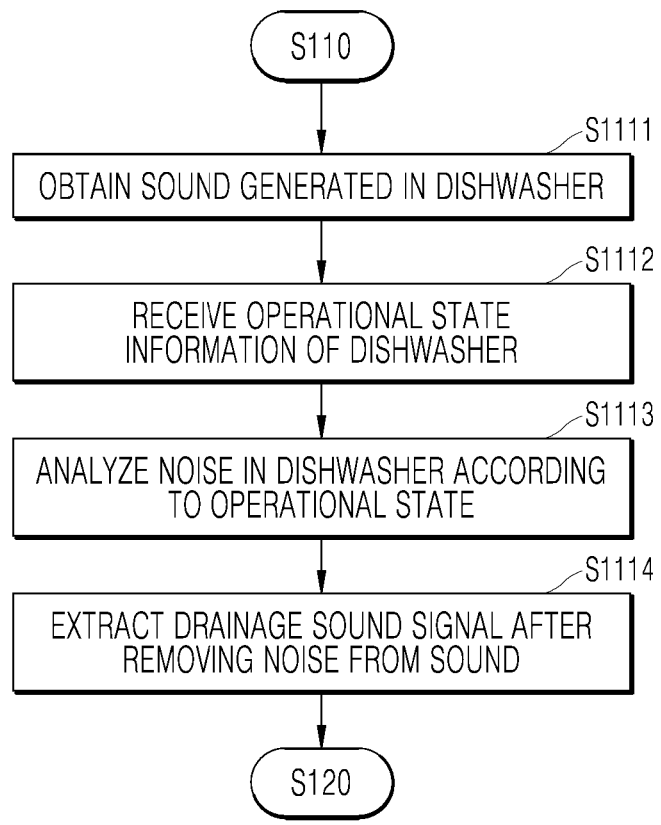
FIG. 8 is a flowchart showing a process of learning drainage sound data according to a third embodiment of FIG. 5.

FIG. 5 is a flowchart showing a process of notifying the degree of closure of a filter by a washing water sound signal caused by draining washing water based on drainage sound data according to the degree of closure of the filter according to an embodiment of the present disclosure, FIG. 6 is a flowchart showing a process of learning drainage sound data according to a first embodiment of FIG. 5, FIG. 7 is a flowchart showing a process of learning drainage sound data according to a second embodiment of FIG. 5, and FIG. 8 is a flowchart showing a process of learning drainage sound data according to a third embodiment of FIG. 5. In the following description, the description of parts overlapping with the description of FIGS. 1 to 4 will be omitted.

The dishwasher 1000 according to an embodiment of the present disclosure includes the filter 1500 configured to prevent foreign matter from flowing into the washing pump or the drainage pump. Specifically, the dishwasher in which the filter 1500 has been installed may be driven through a series of operations in which the washing water having passed through the filter is pressurized by the washing pump, sprayed from the nozzle, and then returned to the washing pump through the filter again.

If the filter has been clogged by foreign matter, the amount of the washing water flowing into the washing pump is reduced to reduce the amount of circulating water, thereby weakening the cleaning performance of the dishwasher.

To this end, it is possible to analyze the degree of closure of the filter 1500 through the drainage sound of the washing water drained to the filter 1500. That is, the closure of the filter may be sensed through a change in the drainage sound of the washing water drained to the filter, and the operational state of the dishwasher may be analyzed by sensing the closure of the filter.

Specifically, the dishwasher 1000 capable of sensing the closure of the filter 1500 may obtain a drainage sound signal generated by draining the washing water through the filter 1500 when the dishwasher 1000 operates (operation S110).

The dishwashing may be performed by putting the dishes for washing into the dishwasher 1000 and driving the dishwasher 1000. At dishwashing, the washing water having washed dishes may be circulated or drained. In this series of processes, the drainage sound of the washing water generated while the washing water is drained through the filter is obtained.

When obtaining the drainage sound of the washing water (operation S110), the drainage sound signal may be extracted at the time at which the operation of the dishwasher is stopped and the washing water is drained to the filter 1500 (operation S112). That is, the drainage sound signal is extracted from the time point at which the washing water flows into the filter in order to prevent the noise of surroundings together from being extracted when extracting the drainage sound signal.

Thereafter, after draining the washing water to the filter 1500, the drainage sound signal of the washing water may be extracted through the process of extracting the drainage sound signal (operations S114, S116).

Alternatively, when obtaining the drainage sound of the washing water (operation S110), the drainage sound signal may be extracted by storing the start time point and the completion time point of the operation of the dishwasher 1000 (operation S111).

That is, in order to extract the drainage sound signal, a series of operational plans from inflow of the washing water to dry of the washed dishes, which is an operational plan from the time point at which the dishwasher 1000 operates to the time point at which the operation of the dishwasher 1000 is completed, are stored.

According to the thus stored operational plan, the drainage sound signal may be extracted and obtained from the time point at which the washing water flows into the dishwasher (operations S113, S115). Specifically, the operational plan of the dishwasher means that the process of washing, rinsing, drying, and the like is repeatedly performed for a certain time. Accordingly, the time point at which the washing water flows into may be made according to a predetermined operational plan, and the time point at which the drainage sound signal is generated may be a time point at which the washing water flows into the dishwasher according to the operational plan. Accordingly, the drainage sound signal is obtained only at the time at which the washing water flows into according to the pre-stored condition.

Accordingly, it is possible to prevent the noise generated at operation of the dishwasher from interfering with the drainage sound signal, thereby analyzing the closure state of the filter closure more accurately.

Meanwhile, when obtaining the drainage sound of the washing water (operation S110), the sound generated in the dishwasher 1000 and the operational state information of the dishwasher may be received (operations S1111, S1112). That is, the sound generated while the dishwasher drives and the current operational state of the dishwasher are confirmed.

At this time, as described above, the operational state of the dishwasher may be confirmed based on the pre-stored operational plan, and alternatively, the user may also visually confirm the operational state of the dishwasher. Hereinafter, in the following embodiment of the present disclosure, an example that may confirm the state of the dishwasher will be described based on the pre-stored operational plan.

When receiving the operational state information of the dishwasher 1000, the noise of the dishwasher 1000 according to the operational state may be analyzed (operation S1113). At this time, the generated noise of the dishwasher means a sound that may be generated in the dishwasher such as a sound generated when the washing water is sprayed on the dishes, a rotating sound of the nozzle when the washing water is sprayed, and a driving sound of the motor in addition to the drainage sound signal of the washing water.

When analyzing the noise in the dishwasher, only the drainage sound of the washing water may be extracted by removing the noise from the sound of the dishwasher 1000 according to the operation (operation S1114). That is, the remaining sound is removed except for the drainage sound from the entire sound that may be generated in the dishwasher 1000. Accordingly, it is possible to analyze only the drainage sound signal generated when the washing water is drained, thereby analyzing the degree of closure of the filter 1500 more accurately.

Thereafter, the degree of closure of the filter 1500 may be analyzed based on the drainage sound signal (operation S120).

The degree of closure of the filter 1500 means, for example, a random division between 0% of filter clogging that is a fully open state where the foreign matter does not occur in the filter 1500 and 100% of full closure due to foreign matter occurring in the filter 1500. Hereinafter, an embodiment of the present description, for convenience of description, will be described by dividing the degree of closure of the filter 1500 into a first closure stage (filter clogging 0 to 35%), a second closure stage (filter clogging 35 to 70%), and a third closure stage (filter clogging 70 to 100%).

At this time, when analyzing the closure state of the filter 1500 (operation S120), the obtained drainage sound signal may be input to a pre-trained neural network model so as to analyze the degree of closure of the filter 1500 according to the sound signal generated by draining the washing water through the filter 1500, and then the degree of closure of the filter 1500 may be analyzed based on the information output from the neural network model.

That is, the drainage sound signal generated by draining the washing water through the filter 1500 may be obtained, and the obtained drainage sound signal may be input. Thereafter, the degree of closure of the filter 1500 may be analyzed based on the drainage sound signal data information output from the neural network model stored in the memory 160 described above.

At this time, the memory 160 may store the drainage sound signal data information drained to the filter 1500 according to the closure stage of the filter 1500, when flowing into the washing water for washing the dishes accommodated in the dishwasher 1000. The neural network model may be generated by training the stored drainage sound signal data through a training program.

Thereafter, if the degree of closure is a predetermined level or more, an alarm may be generated (operation S130). That is, the user may be notified of the closure state of the filter 1500, thereby replacing or exchanging the filter 1500.

Figure 9:
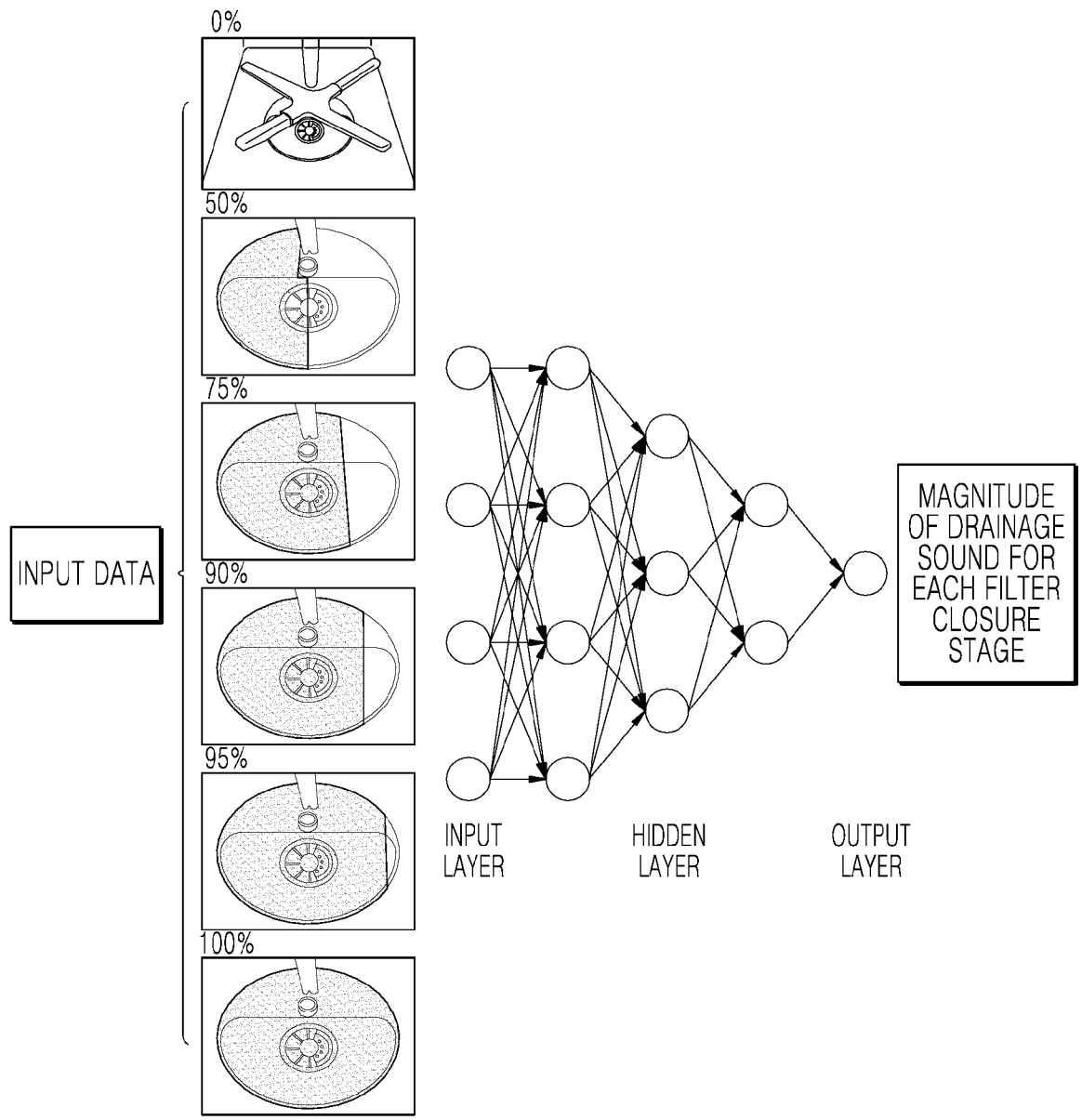
FIG. 9 is a diagram for explaining a deep neural network model for deciding a drainage sound signal according to the degree of closure of a filter in a dishwasher according to an embodiment of the present disclosure.

FIG. 9 is a diagram for explaining a deep neural network model for deciding a drainage sound signal according to the degree of closure of a filter in a dishwasher according to an embodiment of the present disclosure.

The dishwasher 1000 may also use a pre-trained deep neural network model by using machine learning of artificial intelligence in order to analyze the degree of closure of the filter.

Artificial intelligence (AI) is an area of computer engineering science and information technology that studies methods to make computers mimic intelligent human behaviors such as reasoning, learning, self-improving, and the like.

Further, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. Specifically, the Machine Learning may be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

Machine learning of the artificial neural network may include unsupervised learning and supervised learning.

Deep learning, which is a subfield of machine learning, enables data-based learning through multiple layers. Deep learning may represent a set of machine learning algorithms that extract core data from a plurality of data sets as the number of layers increases.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. The RNN is widely used in natural language processing, and may be effectively used to process time-series data that changes over time, and may construct an ANN structure by progressively extracting higher level features through multiple layers. The DBN may include a deep learning structure that is constructed by stacking the result of restricted Boltzman machine (RBM) learning in multiple layers. A DBN has the number of layers formed by repeating RBM training. A CNN includes a model mimicking a human brain function, built under the assumption that when a person recognizes an object, the brain extracts the most basic features of the object and recognizes the object based on the results of complex processing in the brain.

Further, the artificial neural network may be trained by adjusting weights of connections between nodes (if necessary, adjusting bias values as well) so as to produce a desired output from a given input. Also, the artificial neural network may continuously update the weight values through learning. Furthermore, methods such as back propagation may be used in training the artificial neural network.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and obtains problem-solving capability as the strengths of synaptic interconnections are adjusted throughout training.

The terms 'artificial neural network' and 'neural network' may be used interchangeably herein.

An ANN may include a number of layers, each including a number of neurons. Further, the Artificial Neural Network may include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

Further, in general, a multi-layer neural network may include an input layer, one or more hidden layers, and an output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron may be activated and output an output value obtained through an activation function.

In the meantime, a deep neural network with a plurality of hidden layers between the input layer and the output layer may be the most representative type of artificial neural network which enables deep learning, which is one machine learning technique.

An ANN may be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data may classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network may be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

In the meantime, the training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

The Reinforcement Learning is a theory that if an agent may determine what action should be done every moment, then it is possible to find the best path with experience without data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters may be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Accordingly, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters may be set to optimal values that provide a stable learning rate and accuracy.

By using the above methods, the estimation of the state of the object to be heated may be further refined.

Various methods may be present in order to generate a deep neural network model for use in an embodiment of the present disclosure, but in the case of supervised learning, the following training process may be performed as a preliminary task.

The dishwasher may constitute a training data set labeled to sense the drainage sound signal of the washing water drained through the filter by closing the filter by degrees, and to analyze the degree of closure of the filter according to the sound signal generated by draining the washing water through the filter.

When the deep neural network model is trained with the training data, the trained learning model may reflect the features of the dishwasher to analyze whether to notify the user of the above according to the degree of closure of the filter.

The user may provide continuous feedback with respect to the analysis result of the deep neural network model, thereby further refining the learning model.

The example embodiments described above may be implemented through computer programs executable through various components on a computer, and such computer programs may be recorded on computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. That is, the present disclosure is not necessarily limited to the order in which the individual steps are recited. Also, the steps included in the methods according to the present disclosure may be performed through the processor or modules for performing the functions of the step. All examples described herein or the terms indicative thereof ("for example," etc.) used herein are merely to describe the present disclosure in greater detail. Accordingly, it should be understood that the scope of the present disclosure is not limited to the example embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method of determining a degree of closure of a filter of a dishwasher, the method comprising:
   obtaining, by a microphone, a drainage sound signal generated by draining washing water through the filter during operation of the dishwasher;
   analyzing the degree of closure of the filter based on the drainage sound signal; and
   generating an alarm when the degree of closure is greater than or equal to a predetermined level,
   wherein obtaining the drainage sound signal includes:
      obtaining a sound generated in the dishwasher;
      receiving information on an operational state of the dishwasher;
      analyzing noise in the dishwasher associated with the operational state; and
      extracting the drainage sound signal by removing the noise from the sound.

2. The method of claim 1, wherein obtaining the drainage sound signal includes extracting the drainage sound signal at a time point at which operation of the dishwasher is stopped and the washing water is drained to the filter.

3. The method of claim 1, wherein obtaining the drainage sound signal includes:
   storing an operational plan from an operating start time point of the dishwasher to an operating completion time point of the dishwasher; and
   obtaining the drainage sound signal at a time point at which the washing water flows into the dishwasher according to the operational plan.

4. The method of claim 1, further comprising:
obtaining a reference signal of a drainage sound drained through the filter for predetermined degrees of closure of the filter through which the washing water is drained; and
generating a matching table comprising the obtained reference signals by matching with each predetermined degrees of closure of the filter,
wherein analyzing the degree of closure of the filter comprises matching the drainage sound signal with one of the obtained references signals in the matching table.

5. The method of claim 1, wherein analyzing the degree of closure of the filter includes:
inputting the obtained drainage sound signal to a pre-trained neural network model; and
determining the degree of closure of the filter based on an output from the pre-trained neural network model.

6. A computer readable recording medium storing a computer program that executes the method of claim 1 using a computer.

7. A dishwasher, comprising:
a tub;
at least one rotatable arm arranged in the tub;
a sump located at bottom of the tub, the sump having a filter;
a microphone to obtain a drainage sound signal generated by draining washing water through the filter during operation of the dishwasher;
a processor configured to analyze the degree of closure of the filter based on the drainage sound signal; and
an alarm generator configured to generate an alarm when the degree of closure is greater than or equal to a predetermined level,
wherein the microphone obtains a sound generated in the dishwasher including the drainage sound, and
wherein, to analyze the degree of closure of the filter based on the drainage sound signal, the processor is configured to:
obtain information on an operational state of the dishwasher;
analyze noise in the dishwasher associated with the operational state of the dishwasher; and
extract the drainage sound signal by removing the noise from the sound generated in the dishwasher obtained from the microphone.

8. The dishwasher of claim 7, wherein the microphone is configured to obtain the drainage sound signal at a time point at which operation of the dishwasher is stopped and the washing water is drained to the filter.

9. The dishwasher of claim 7, wherein the microphone includes a storage and an operational plan stored in the storage, the operational plan defining an operating start time point of the dishwasher to an operating completion time point of the dishwasher, and
wherein the microphone is configured to obtain the drainage sound signal from a time point at which the washing water flows into the dishwasher according to the operational plan.

10. The dishwasher of claim 7, further comprising a memory configured to store a matching table, the matching table including a reference signal of a drainage sound drained through the filter for predetermined degrees of closure of the filter through which the washing water is drained,
wherein the processor is configured to analyze the degree of closure of the filter by matching the drainage sound signal with one of the reference signals in the matching table.

11. The dishwasher of claim 7, wherein, to analyze the degree of closure of the filter based on the drainage sound signal, the processor is configured to:
input the obtained drainage sound signal to a pre-trained neural network model, and
determine the degree of closure of the filter based on an output from the pre-trained neural network model.

12. An electronic device, comprising:
a tub having an accommodation space in which an object is accommodated;
a washing water supplier configured to accommodate washing water supplied into the tub, and to supply steam generated by heating the washing water to the tub through a plurality of steam flow paths;
a filter through which the washing water is drained from the tub; and
a processor configured to analyze an operational state of the electronic device based on a drainage sound signal of the washing water drained to the filter associated with a degree of closure of the filter,
wherein the electronic device further comprises a microphone configured to obtain the drainage sound signal of the washing water at a time point at which operation of the electronic device is stopped and the washing water is drained to the filter,
wherein the microphone is configured to obtain a sound generated in the electronic device including the drainage sound, and
wherein the processor is configured to:
obtain information on an operational state of the electronic device;
analyze noise in the electronic device associated with the operational state of the electronic device; and
extract the drainage sound signal by removing the noise from the sound generated in the electronic device obtained from the microphone.

13. The electronic device of claim 12, further comprising a memory configured to store a matching table, the matching table including a reference signal of a drainage sound drained through the filter for predetermined degrees of closure of the filter through which the washing water is drained,
wherein the processor is configured to analyze the degree of closure of the filter by matching the drainage sound signal with one of the reference signals in the matching table.

14. The electronic device of claim 12, wherein the processor is configured to:
input the drainage sound signal to a pre-trained neural network model, and
determine the degree of closure of the filter based on an output from the pre-trained neural network model.

15. The electronic device of claim 12, wherein the microphone includes a storage and an operational plan defining an operating start time point of the electronic device to an operating completion time point of the electronic device stored in the storage, and
wherein the microphone is configured to obtain the drainage sound signal from a time point at which the washing water flows into the electronic device according to the operational plan.

16. The electronic device of claim 12, further comprising an alarm generator configured to generate an alarm when the degree of closure is greater than or equal to a predetermined level.

\* \* \* \* \*